C. H. DURKEE.
Grain Binder.
No. 26,171.
2 Sheets—Sheet 1.
Patented Nov. 22, 1859.
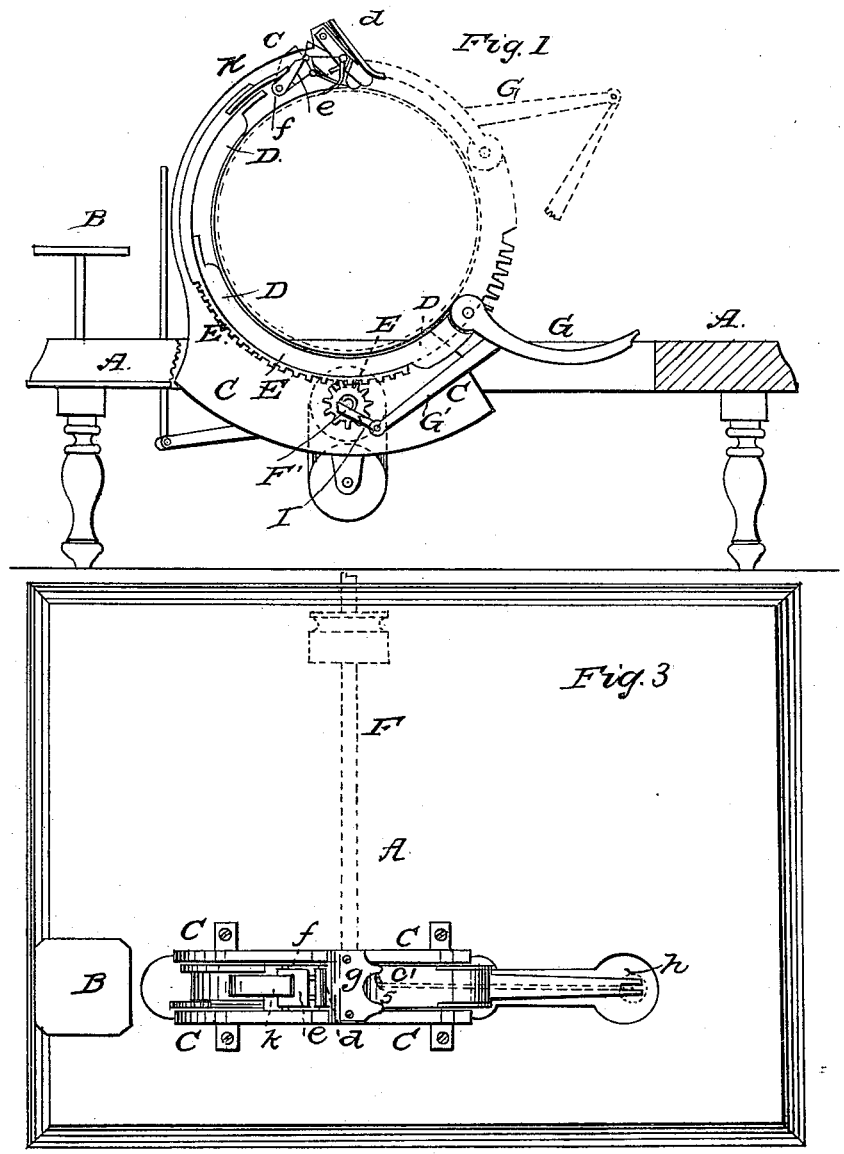

C. H. DURKEE.
Grain Binder.
No. 26,171.
2 Sheets—Sheet 2.
Patented Nov. 22, 1859.
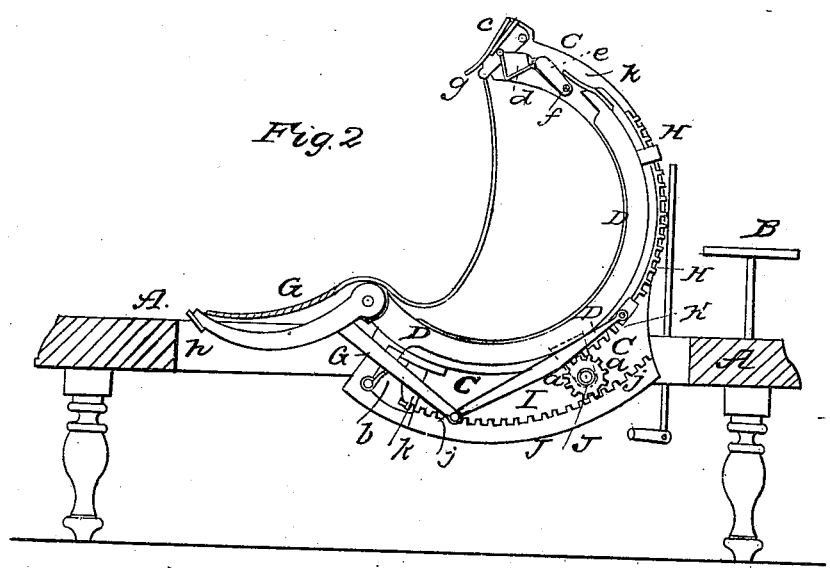
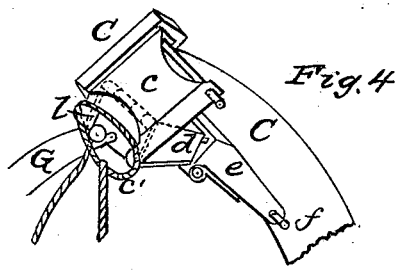
Witnesses
R. J. Shelton
Thomas M. Shelton
Inventor
C. H. Durkee

UNITED STATES PATENT OFFICE.

C. H. DURKEE, OF HARTFORD, WISCONSIN.

IMPROVEMENT IN GRAIN-BINDERS.

Specification forming part of Letters Patent No. 26,171, dated November 22, 1859.

*To all whom it may concern:*

Be it known that I, C. H. DURKEE, of Hartford, in the county of Washington and State of Wisconsin, have invented a new and Improved Grain-Binder; and I do hereby declare that the following is a full, clear, and exact description thereof, reference being had to the accompanying drawings, forming a part of this specification, in which—

Figure 1 is a vertical longitudinal section taken through the apparatus, showing one side of the same; this figure also shows the parts in the two positions for effecting the binding. Fig. 2 is a vertical longitudinal section, looking in the opposite side of the apparatus; this figure shows the band and several parts ready to receive the sheaf. Fig. 3 is a plan view of the binder, with the band in the position shown by Fig. 2. Fig. 4 shows the introduction of the button in the loop.

My invention and improvement relates to that class of machines for binding grain into sheaves before it leaves the platform of the harvester, by a simple automatic arrangement which requires only one attendant, and which will gather the grain as it falls upon the platform of the harvester and bundle it, and at the same time secure the band around the bundle.

My invention consists in the arrangement of a traveling segment in a fixed frame, operated by a rack and pinion, and in suitable guides in said frame, so as to have an alternate circular movement, for the purpose of carrying a jointed arm around the grain, which arm has on its end a button, which is fastened to one end of the band to be secured around the sheaf, which is supposed to be within the circle formed by the frame and traveling segment and jointed arm above mentioned.

It further consists in a novel arrangement of parts for operating the aforesaid jointed (button) arm with an independent movement, so that its motion will be faster than that of the traveling segment, as and for the purposes hereinafter described.

It also consists in arranging near the end of the elevated frame a peculiar device, which, in connection with a loop-holder and jointed arm, will retain the loop on one end of the band in position for receiving the button and as the button is passed through said loop it will be properly secured around the bundle said device being operated by a projection or the end of the traveling segment for retaining the loop on its holder until it is relieved at the proper time by the jointed arm, all as hereinafter described.

To enable others skilled in the art to fully understand my invention, I will proceed to describe its construction and operation.

The drawings represent the binding apparatus resting upon legs; but A is intended to represent the platform of the reaper, to which my invention is applied, and situated in a convenient place thereon for receiving and discharging the grain. The operator sits on the seat B, with the binding apparatus before him and with his bands in a convenient place. Said bands consist of a strong twine, with a suitable button secured on one end and a loop on the other, the object being to gather and compress the grain in bundles and button these bands around them securely, and then to remove the sheaves from the platform of the reaper, which latter operation is performed by the operator.

For this purpose I arrange, side by side, two semicircular plates, C C, which are let into a recess and secured rigidly to the platform A; these constitute the frame for supporting the movable parts. Between these two plates C C is a traveling segment, D, which moves in suitable guides in the frame, and is operated by means of a pinion, E, and rack E'. The pinion is fixed to the end of a shaft, F', said shaft being connected by suitable gearing to the driving-wheel of the reaper, in such a manner that its motion will be alternate, while the rack-teeth project from the under side of the segment. This traveling segment carries on one end a jointed and curved arm, G, having a suitable notch in its end for receiving the button end of the band, as clearly shown by Fig. 4 of the drawings. This jointed arm has an arm, G', projecting out a suitable distance from its back, and near the joint, which is connected to a rack, H, by a jointed connecting-rod, I. The rack H works in a groove which is formed in a flange projecting from the under side of the traveling segment, nd rides upon a spur-wheel, J, corresponding n size to spur-wheel E, which is pivoted to irm a. This arm is fixed to one side of the raveling segment D. The spur-wheel J engages with the teeth of a rack, J', made stationary upon the inside of the frame, as shown by Fig. 2. K is a swinging segment with rack-teeth. This rack is pivoted to the inside of the frame, and is held against the rack J' by a spring, b, until the spur-wheel J is brought over onto it, when it will move along with the traveling segment D, and its action upon the racks J' and H will cease, and the jointed arm G will be moved forward to the loop by the action of the pinion E upon rack E'. Then, when the motion of the shaft F' is reversed, the jointed arm will be withdrawn from the loop by the action of the pinion E alone. When the spur J is brought into gear with the rack J', the arm G will move faster than the traveling segment by the action of the pinion upon the rack H and J, the arc of which latter is greater than that of the rack H or E', and the jointed arm G will by these means be carried down below the surface of the platform, so as to be out of the way of the grain to be drawn into the binder, and at the same time the end of this arm will be moved up in proper time and position for inserting the button through the loop, and it will also receive and compress the desired quantity of grain for making the sheaves tight when bound.

The securing of the ends of the band together after the bundle is compressed, with the band around it, by the devices herein described, is effected as follows:

c is a plate or loop-holder of metal, (shown clearly by Fig. 4,) which has two arms with notches for receiving the loop c'. The upper end of this plate is pivoted to the head of the frame of the machine so as to swing freely from this point. The face of this plate is cut so as to permit the end of the jointed arm G to pass freely under it, and between its notched arms. Behind this plate, and hinged to it below its center, is a trip-block, d, hinged to a block, e, which latter is pivoted to the frame at f. When these blocks are in the position shown by Figs. 2 and 4, the face of the loop-holder c is flush with the ends of the frame C C, upon which is screwed a face-plate, g, (shown by Figs. 1, 2, and 3,) the object of which is to prevent the loop from falling out of the notches in the holder c when the parts are in the above position.

The operation of securing the band is as follows: The operator hooks the button end of the band in the slot in the jointed arm G, and the loop over the notches in the loop-holder, the bands being the proper length for the bundle of grain to be bound, the arm G having receded from the loop-holder and been carried below the surface of the platform A, as in Figs. 1, 2, and 3, and when the desired quantity has been gathered into the binder, this arm is brought round and over the bundle, carrying with it the band, as shown by Fig. 1, and its end passes through the loop, as shown by Fig. 4, when it strikes the end of the trip-block d, and throws the loop from the loop-holder c over the button h, and the band is secured. The arm G then recedes again, carrying with it the button end of another band, which is attached to it by the operator immediately after the first operation is performed. The loop end of the band is also placed in the notch on the holder, as before stated. When the arm G passes below the surface of the platform, the loop-holder c is thrown up against the plate g by a finger, k, which projects from the end of traveling segment D, and presses the block e down, and holds the parts in position until the jointed arm starts to return, when the tension of the band will keep the loop in its notches until the blocks are tripped by the end of the arm G at the proper time for securing the loop over the button. Another band is then secured in its place, and the same operation is repeated for each sheaf, they being removed from the platform as fast as they are bound.

The proper time for gathering the grain for binding is determined by the operator, and the operation of the binder is controlled by him by any suitable device for throwing the shaft F in and out of gear with the working parts above described.

Having thus described my invention, what I desire to secure by Letters Patent is—

1. The combination of the traveling segment D, jointed arm G, its rod G', connecting-rod I, and rack H, operated by pinion J, rack J', when the same are arranged and operate as herein set forth.

2. The swinging rack K, in combination with the traveling segment D, for receiving and holding the pinion J while the end of the arm G is being passed through the loop, in the manner set forth.

3. The loop-holder c, trip-block d, and block e, arranged and operating substantially as and for the purposes herein set forth.

C. H. DURKEE.

Witnesses:
THOS. SKELTON,
THOMAS M. SKELTON.